(12) United States Patent
Ward

(10) Patent No.: US 8,906,328 B2
(45) Date of Patent: Dec. 9, 2014

(54) HEAP LEACHING OF MANGANESE-CONTAINING ORES

(75) Inventor: Christopher Brett Ward, Attadale (AU)

(73) Assignee: Mesa Minerals Limited, Applecross (AU)

( * ) Notice: Subject to any disclaimer, the term of this patent is extended or adjusted under 35 U.S.C. 154(b) by 0 days.

(21) Appl. No.: 13/994,412

(22) PCT Filed: Nov. 8, 2011

(86) PCT No.: PCT/AU2011/001436
§ 371 (c)(1),
(2), (4) Date: Jul. 11, 2013

(87) PCT Pub. No.: WO2012/079111
PCT Pub. Date: Jun. 21, 2012

(65) Prior Publication Data
US 2013/0309151 A1    Nov. 21, 2013

(30) Foreign Application Priority Data

Dec. 16, 2010  (AU) ................................ 2010905531

(51) Int. Cl.
| | | |
|---|---|---|
| *C22B 3/00* | (2006.01) | |
| *C22B 3/08* | (2006.01) | |
| *C22B 47/00* | (2006.01) | |
| *C22B 3/06* | (2006.01) | |
| *C22B 3/44* | (2006.01) | |

(52) U.S. Cl.
CPC . *C22B 3/08* (2013.01); *C22B 47/00* (2013.01); *C22B 3/06* (2013.01); *C22B 3/44* (2013.01)

USPC ................................ 423/49; 423/52; 423/544

(58) Field of Classification Search
None
See application file for complete search history.

(56) References Cited

U.S. PATENT DOCUMENTS

| | | |
|---|---|---|
| 4,511,540 A | 4/1985 | Crussard et al. |
| 4,740,243 A | 4/1988 | Krebs-Yuill et al. |
| 2010/0296988 A1* | 11/2010 | Roche et al. .................... 423/49 |

FOREIGN PATENT DOCUMENTS

| | | |
|---|---|---|
| CN | 1465723 A | 7/2004 |
| CN | 1618995 A | 5/2005 |
| WO | WO-98/14623 A1 | 4/1998 |
| WO | WO-2009/079716 A1 | 7/2009 |

OTHER PUBLICATIONS

Chinese Patent Office First Office Action dated Apr. 3, 2014 with included English Machine Translation.
International Search Report and Written Opinion for PCT/AU2011/001436, mailed Mar. 28, 2012; ISA/AU.

* cited by examiner

*Primary Examiner* — Steven Bos
(74) *Attorney, Agent, or Firm* — Harness, Dickey & Pierce, P.L.C.

(57) ABSTRACT

A method for the heap leaching of manganese-containing ores, the method characterized by the steps of: (i) beneficiating the manganese-containing ore and separating into a coarse fraction and a fine ore fraction; (ii) combining the fine ore fraction with a sulfide ore material to produce a combined ore fraction; (iii) stacking the combined ore fraction to form at least one heap; and (iv) applying a lixiviant to the heap to produce a pregnant leach solution (PLS) containing dissolved manganese values, wherein the lixiviant is added to the or each heap in the presence of soluble iron.

20 Claims, 1 Drawing Sheet

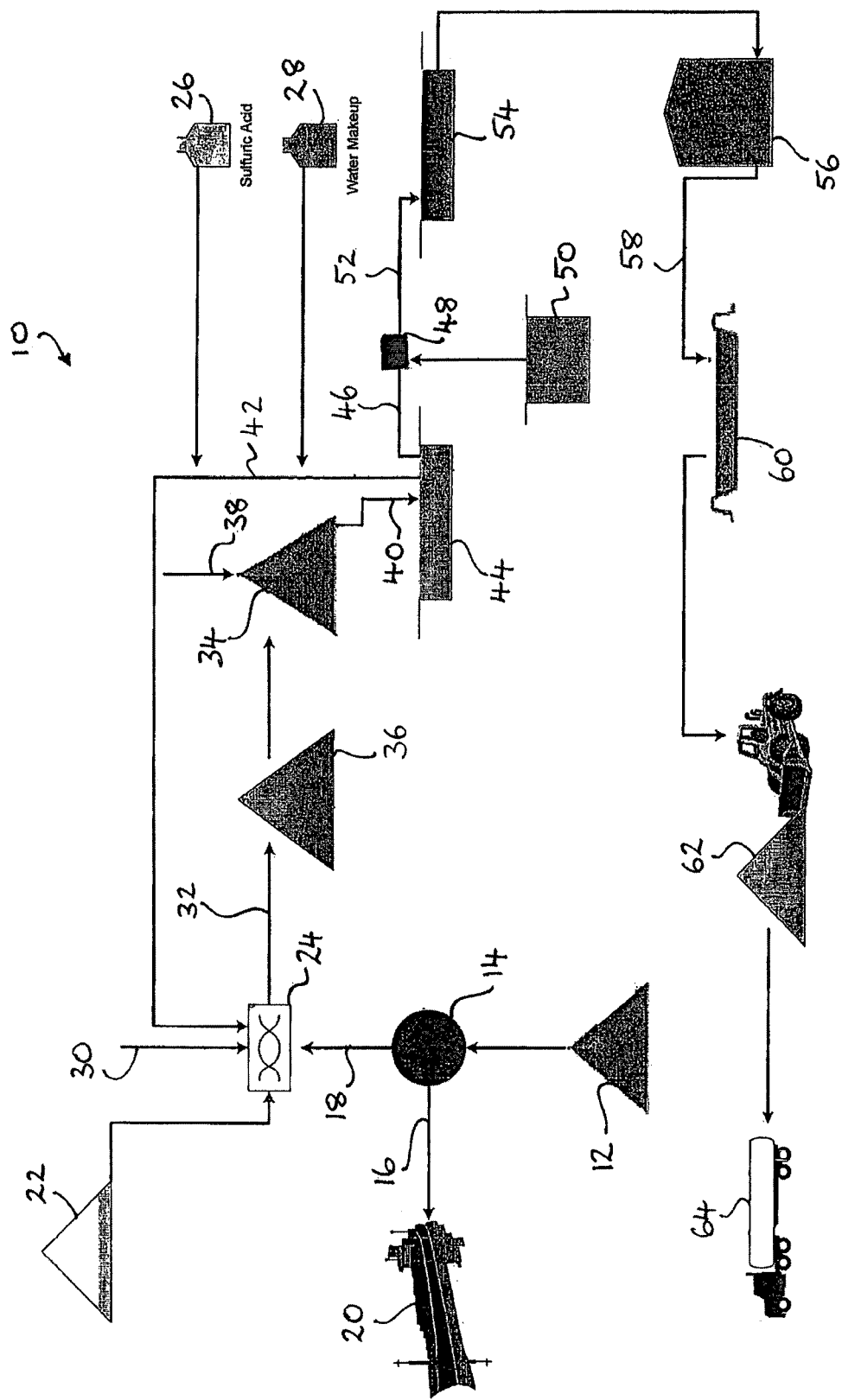

HEAP LEACHING OF MANGANESE-CONTAINING ORES

FIELD OF THE INVENTION

The present invention relates to a method for the heap leaching of manganese-containing ores. More particularly, the method of the present invention is intended to provide a process capable of treating low grade manganese oxide ores and utilising waste sulfide materials.

BACKGROUND ART

Manganese oxide ores predominantly contain manganese in the $4^+$ valence state and are largely insoluble in acidic media. To produce manganese chemicals and feed solutions for electrolytic manganese processes conventional practice has been to roast reduce the manganese to manganous oxide ($2^+$ valence state) and then dissolve the manganous oxide in sulfuric acid. Sulfur dioxide has also been utilised in reductive leach processes to produce manganese sulfate. However, this technology has lacked efficiency due to the formation of manganese dithionate and manganese poly-thionate species as by products.

The manganese dioxide leaching route is considered to be relatively capital intensive, requiring either a reduction kiln to reduce the manganese prior to acid leaching or a sulfur burning plant to produce a liquefied or gaseous $SO_2$ reductant for direct leach of the manganese dioxide. The handling of gas also inevitably means the size of the plant is increased in order to have the capacity required to treat the ore body.

Traditionally, low or zero value waste manganese ore materials resulting from the production of lump manganese ores have been deposited in tailings dams or in waste stockpiles at manganese mine sites. Such waste manganese ore materials may be the product of, for example, a Dense Medium Separation (DMS) Plant. Conventional processing of manganese ores has also involved milling of the ore to improve leaching kinetics in order to make the leach process viable. This milling process has been known to lead to fugitive dust emissions and localised contamination.

The treatment of sulfide ores results in sulfide waste materials being kept at site, in stockpiles or tailings dams. This is a significant problem for most sulfide treatment plants as there are environmental implications and liabilities, such as acid mine drainage (AMD).

The method of the present invention has as one object thereof to substantially overcome problems associated with the prior art, or to at least provide a useful alternative to those prior art methods.

The preceding discussion of the background art is intended to facilitate an understanding of the present invention only. The discussion is not an acknowledgement or admission that any of the material referred to is or was part of the common general knowledge in Australia or any other country as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a method for the heap leaching of manganese-containing ores, the method characterised by the steps of:

(i) beneficiating the manganese-containing ore and separating into a coarse fraction and a fine ore fraction;
(ii) combining the fine ore fraction with a sulfide ore material to produce a combined ore fraction;
(iii) stacking the combined ore fraction to form at least one heap; and
(iv) applying a lixiviant to the heap to produce a pregnant leach solution (PLS) containing dissolved manganese values, wherein the lixiviant is added to the or each heap in the presence of soluble iron.

Preferably, the fine ore faction has a particle size of less than about 6 mm.

More preferably, the fine ore fraction has a particle size of less than about 1 mm.

Preferably, the beneficiation step involves the use of a dense media separation (DMS) plant.

The coarse ore fraction includes, but is not limited to, a lump ore fraction resulting from the DMS plant.

The ratio of manganese-containing ore to sulfide ore in the combined ore fraction is preferably within the range of about 3:1 to 8:1.

More preferably, the ratio of manganese-containing ore to sulfide ore in the combined ore fraction is about 5:1.

The sulfide ore material is preferably a waste sulfide ore material.

In one form the present invention includes an agglomeration step after step (ii).

Alternatively, the agglomeration step can be used to effect the combination of the fine ore fraction with the sulfide ore material in step (ii).

The agglomeration step is preferably performed using one or more of acid, water, or PLS.

Preferably, where sulfuric acid is used in the agglomeration step, the acid concentration is within the range of about 5 to 15 g/L.

More preferably, the agglomeration step includes the use of a binding agent selected from lime, cement or polymer binding agents known in the art.

The lixiviant of step (iv) is preferably in the form of sulfuric acid.

Preferably, the concentration of the sulfuric acid lixiviant is within the range of about 40 to 80 g/L.

Preferably, the soluble iron is in the form of ferrous iron.

Preferably, soluble iron is contained within the lixiviant. Alternatively, the soluble iron can be added separately.

The soluble iron is preferably added as ferrous sulfate, or added via addition of PLS.

The concentration of soluble iron added to the heap with the lixiviant is preferably in the range of about 5 to 20 g/L.

The PLS is preferably recirculated through the heap until the manganese content to within the range of about 30 to 80 g/L.

The pH of the heap is preferably within the range of about 1.5 to 3.5.

Preferably, in one form, the method of the present invention also includes the further steps of:

(v) drawing a bleed stream from the PLS and raising the pH of said stream to at least about 5.5 to produce a neutralised PLS; and
(vi) directing the neutralised PLS to a solid/liquid separation step to separate iron oxides and/or hydroxides from the neutralised PLS.

Preferably, the solid/liquid separation step is conducted in a settling pond.

The pH of the bleed stream of PLS is preferably raised by the addition of a neutralising agent.

More preferably, the neutralising agent includes limestone.

Preferably, the pH of the neutralised PLS is within the range of about 5 and 6.

In one form the method of the present invention still further includes the step of:

(vii) directing an overflow of neutralised PLS from the solid/liquid separation step to an evaporation pond to crystallise manganese sulfate.

Optionally, the overflow of neutralised PLS is directed to a purification step prior to the evaporation pond.

More preferably, the purification step includes the addition of a sulfiding reagent to reduce heavy metal content, such as Ni, Co, Pb and/or Mo, in the neutralised PLS.

Still preferably, impurity/Ni/Co/Pb/Mo concentrations in the neutralised PLS are below about 1 ppm, after the addition of the sulfiding reagent.

The sulfiding reagent preferably includes, but is not limited to, one or more of NaHS or NaS.

Preferably, the manganese-containing ore is a manganese oxide ore.

More preferably, the manganese-containing ore is a low grade manganese-containing ore.

Still preferably, the low grade manganese containing ore has a manganese content of less than about 25%.

The sulfide ore material is preferably a waste sulfide material.

Preferably, the agglomerated ore is subjected to a curing step prior to leaching the heap.

More preferably, the curing time is at least 24 hours.

BRIEF DESCRIPTION OF THE DRAWINGS

The present invention will now be described, by way of example only, with reference to one embodiment thereof and the accompanying drawing, in which:—

FIG. 1 is a diagrammatic representation of a flow sheet depicting a method for the heap leaching of a manganese-containing ore in accordance with the present invention.

BEST MODE(S) FOR CARRYING OUT THE INVENTION

In FIG. 1 there is shown a method 10 for the heap leaching of manganese-containing ores in accordance with the present invention.

A manganese-containing ore, for example a manganese oxide ore 12, is beneficiated by subjecting the manganese-containing ore 12 to a crushing and screening step 14, and separating the manganese-containing ore into a coarse ore fraction 16 and a fine ore fraction 18. The fine ore faction 18 has a particle size of less than about 6 mm for example, less than about 1 mm. The crushing and screening step 14 may also include passing the manganese-containing ore through a dense media separation (DMS) plant (not shown), which separates dense manganese from low-grade silica and gangue materials. This use of DMS produces a coarse ore fraction 16 in the form of a lump ore fraction which can be shipped 20 directly to market.

The fine ore fraction 18 is then combined with a sulfide ore material 22, in an agglomeration step 24. Alternatively, the fine ore fraction 18 can be combined with the sulfide ore material 22 first, and the combined ore directed to the agglomeration step 24. The ratio of fine ore fraction 18 (i.e. manganese ore) to sulfide ore material 22, is about 5:1. The agglomeration step 24 can be performed using acid, for example sulfuric acid 26 having a concentration within the range of about 5 to 15 g/L, water 28 only, or water with a binding agent 30, or water, PLS and the binding agent, or any combination thereof. The binding agent 30 is selected from any one or more of lime, cement or polymer binding agents known in the art.

An agglomerated ore 32 exiting the agglomeration step 24, is then stacked to form at least one heap 34. The agglomerated ore 32 undergoes a heap preparation step 36, which ensures continuous leaching as the prepared heap 36 can be leached as the at least one heap 34 becomes exhausted. Thus, the heap preparation step 36 also involves curing of the agglomerated ore 32, for example, for at least 24 hours.

A lixiviant 38, for example sulfuric acid having a concentration of between about 40 and 80 g/L, is applied to the top of the or each heap 34. In addition to acid, it is desirable that the lixiviant 38 contains solubilised iron in the form of ferrous iron, by addition of ferrous sulfate. Solubilised iron can also be added by way of addition of a pregnant leach solution (PLS) 40 to the or each heap 34. Alternatively, soluble iron can be added separately to the lixiviant 38. The concentration of soluble iron added to the heap with the lixiviant 38 is within in the range of about 5 to 20 g/L.

Without wishing to be bound by theory, it is understood that the solubilised iron acts as a charge transfer reagent in the leaching reaction. The reduction of solid manganese oxide present in the ore, to soluble $Mn^{2+}$ can be slow if the reaction occurs solely through contacting an oxide ore with a sulfide material. By adding soluble iron in, or with, the lixiviant 38, ferrous ions will be oxidised to ferric ions via a reaction with manganese dioxide, resulting in $Mn^{2+}$ ions being solubilised. Subsequently, ferric ions will oxidise sulfide in the sulfide ore material 20, to form soluble sulfate ions and ferrous ions. The regeneration of ferrous ions enables the PLS to usefully be recirculated to leach further manganese from the or each heap 34. The formation of sulfate ions also means that sulfuric acid can be formed as a product in the reaction, thereby reducing the amount of "make up" sulfuric acid required to be added when the PLS is recirculated. Once the or each heap 34 is finished, the PLS 40, having reasonable ferrous and acid content can be used on a new heap.

A recirculation stream 42 of the PLS 40 exiting the base of the heap is redirected through the heap 34, until the solubilised manganese content in the PLS 40 is within the range of about 30 to 80 g/L. The PLS 40 exiting the base of the heap 34 is stored in a pond 44 from which the recirculation stream 42 is drawn. A bleed stream 46 is drawn from the PLS pond 44 and directed to a neutralisation circuit 48 in which the pH adjusted to about 5.5; for example within the range of about 5 and 6. The pH adjustment is achieved by the addition of a neutralising agent, for example limestone 50. A neutralised PLS 52 exiting the neutralisation circuit 48 is then directed to a solid/liquid separation step, for example a settling pond 54, in which iron oxides and iron hydroxides precipitate and settle out of solution.

An overflow of the neutralised PLS 52 from the settling pond 54 then undergoes a purification step 56, to produce a purified PLS 58, whereby heavy metals are removed from solution. The purification step 56 includes but is not limited to the addition of a sulfiding reagent, for example, NaHS or NaS, which causes metal ions such as Ni, Co, Pb and/or Mo to precipitate such that the impurity levels in the purified PLS are below about 1 ppm. The purified PLS 58 is then directed to an evaporation pond 60 in which the PLS 58 is evaporated, allowing manganese sulfate to crystallise. A manganese sulfate product 62 is then collected and shipped 64 directly to market or can undergo further downstream treatments offsite prior to market.

It is understood that the heap 34 may be singular, or there may be a succession of heaps as known in the art.

It is further envisaged that the fresh acid may be added to the recirculated PLS to ensure that acid content in the lixiviant 38 is sufficiently high to maintain the leach reaction, as acid is consumed as it percolates through the heap.

It is also understood that existing technologies such as ion exchange or membrane filtration methods could also be included into the flow sheet 10 prior to the evaporation pond 60 to assist in achieving the required solution tenor, whilst maintaining impurities to a desirable level. This is likely to assist in obtaining an efficient evaporation step and produce the manganese sulfate grade required for any particular application.

The manganese sulfate product resulting from the method 10 of the present invention can be sold directly into the fertilizer industry. It can also be used a feed material and/or further refined to make purified manganese specialty products.

It is understood that a particular advantage of the present invention is the ability to utilise acid-generating sulfide wastes from gold, iron ore, or base metals mine operations, thereby reducing the instance of acid mine drainage (AMD) liability and pollution issues at the site.

The method 10 of the present invention utilises low grade and/or waste materials to produce a saleable product. Beneficially, the method 10 can be implemented at the site or location of these materials to reduce transportation costs, which would traditionally be associated with the transportation of gangue materials to a mine site to be treated.

Unground manganese-containing ore is suitable for the method 10 of the present invention, providing benefits in reducing dust pollution and capital expenditure associated with fine grinding mills. Further, the method 10 of the present invention does not require the use of a reduction kiln or sulfur burning plant, which have traditionally been required to reduce manganese oxide into a form that could be effectively leached with acid.

It is envisaged that the method 10 of the present invention may substantially reduce capital and operating costs in relation to the production of manganese sulfate products, when compared to the prior art processes for manganese sulfate production.

Modifications and variations such as would be apparent to the skilled addressee are considered to fall within the scope of the present invention.

The invention claimed is:

1. A method for the heap leaching of manganese-containing ores, the method characterised by the steps of:
   (i) beneficiating the manganese-containing ore and separating the beneficiated ore into a coarse ore fraction and a fine ore fraction;
   (ii) combining the fine ore fraction with a sulfide ore material to produce a combined ore fraction;
   (iii) stacking the combined ore fraction to form at least one heap; and
   (iv) applying a lixiviant to the heap to produce a pregnant leach solution (PLS) containing dissolved manganese values,
   wherein the lixiviant is added to the or each heap in the presence of soluble iron.

2. The method according to claim 1, wherein the fine ore fraction has a particle size of less than about 6 mm.

3. The method according to claim 1, wherein the beneficiating step uses a dense media separation (DMS) plant.

4. The method according to claim 3, wherein the coarse ore fraction includes a lump ore fraction resulting from the DMS plant.

5. The method according to claim 1, wherein the ratio of manganese-containing ore to sulfide ore material in the combined ore fraction is within the range of about 3:1 to 8:1.

6. The method according to claim 1, wherein the sulfide ore material is a waste sulfide ore material.

7. The method according to claim 1, wherein the method includes either an agglomeration step after step (ii) or an agglomeration step is used to effect the combination of the fine ore fraction with the sulfide ore material in step (ii).

8. The method according to claim 7, wherein the agglomeration step is performed using one or more of acid, water, or PLS.

9. The method according to claim 7, wherein sulfuric acid is used in the agglomeration step, and the acid concentration is within the range of about 5 to 15 g/L.

10. The method according to claim 7, wherein the agglomeration step includes the use of a binding agent selected from lime, cement or a polymer binding agent.

11. The method according to claim 1, wherein the lixiviant of step (iv) is provided in the form of sulfuric acid at a concentration within the range of about 40 to 80 g/L.

12. The method according to claim 1, wherein the soluble iron is contained within the lixiviant in the form of ferrous iron.

13. The method according to claim 1, wherein the soluble iron is added either as ferrous sulfate or is added by addition of PLS.

14. The method according to claim 1, wherein the concentration of soluble iron added to the heap with the lixiviant is in the range of about 5 to 20 g/L.

15. The method according to claim 1, wherein the PLS is recirculated through the heap until the manganese content rises to within the range of about 30 to 80 g/L.

16. The method according to claim 1, wherein the pH of the heap is within the range of about 1.5 to 3.5.

17. The method according to claim 1, wherein the method of the present invention also includes the further steps of:
   (v) drawing a bleed stream from the PLS and raising the pH of said stream to at least about 5.5 to produce a neutralised PLS; and
   (vi) directing the neutralised PLS to a solid/liquid separation step to separate iron oxides and/or hydroxides from the neutralised PLS.

18. The method according to claim 17, wherein the pH of the neutralised PLS is within the range of about 5 and 6.

19. The method according to claim 17, wherein the method of the present invention still further includes the step of:
   (vii) directing an overflow of neutralised PLS from the solid/liquid separation step to an evaporation pond to crystallise manganese sulfate.

20. The method according to claim 19, wherein the overflow of neutralised PLS is directed to a purification step prior to the evaporation pond.

* * * * *